(12) United States Patent
Nielsen et al.

(10) Patent No.: US 12,122,003 B2
(45) Date of Patent: Oct. 22, 2024

(54) AUTOMATED BOLT TENSIONING ROBOT

(71) Applicant: Siemens Gamesa Renewable Energy A/S, Brande (DK)

(72) Inventors: Lars Holm Nielsen, Noerre Snede (DK); Jeffrey Elberling, Highland, MI (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 368 days.

(21) Appl. No.: 17/603,192

(22) PCT Filed: Apr. 14, 2020

(86) PCT No.: PCT/EP2020/060419
§ 371 (c)(1),
(2) Date: Oct. 12, 2021

(87) PCT Pub. No.: WO2020/212323
PCT Pub. Date: Oct. 22, 2020

(65) Prior Publication Data
US 2022/0203486 A1 Jun. 30, 2022

Related U.S. Application Data

(60) Provisional application No. 62/835,583, filed on Apr. 18, 2019.

(30) Foreign Application Priority Data

Jul. 24, 2019 (EP) .................................... 19188050

(51) Int. Cl.
*B23P 19/06* (2006.01)
*F03D 80/50* (2016.01)

(52) U.S. Cl.
CPC ............ *B23P 19/067* (2013.01); *F03D 80/50* (2016.05); *F05B 2260/301* (2013.01)

(58) Field of Classification Search
CPC ........ B23P 19/067; B23P 19/06; B25B 29/02; B25B 21/00; B25B 21/002; B25B 21/007; F03D 13/10; F03D 13/20; F03D 13/50
See application file for complete search history.

(56) References Cited

U.S. PATENT DOCUMENTS 3,015,975 A * 1/1962 Biach ...................... B25B 29/02
81/57.38
4,269,088 A * 5/1981 Dukes ................... B25B 21/002
81/57.39

(Continued)

FOREIGN PATENT DOCUMENTS

| CN | 103534068 A | 1/2014 |
| CN | 103786127 A | 5/2014 |

(Continued)

OTHER PUBLICATIONS

PCT International Search Report & Written Opinion mailed Jul. 13, 2020 corresponding to PCT International Application No. PCT/EP2020/060419, filed Apr. 14, 2020.

*Primary Examiner* — Jason L Vaughan
(74) *Attorney, Agent, or Firm* — Schmeiser, Olsen & Watts LLP

(57) ABSTRACT

A fully-functional automated bolt tensioning device capable of repeatedly tightening bolts within various locations of an operational wind turbine (e.g., hub, tower, etc.) to a specified tension range is provided. The device includes obstacle detection, alignment, an operational graphical user interface, and nut rotation data acquisition for reduced turbine preventative maintenance cost.

18 Claims, 15 Drawing Sheets

(56) References Cited

U.S. PATENT DOCUMENTS

| | | | |
|---|---|---|---|
| 6,634,260 B1 * | 10/2003 | Smith | B25B 23/0078 81/55 |
| 2013/0289769 A1 | 10/2013 | Park et al. | |
| 2014/0306574 A1 | 10/2014 | Twerdochlib | |
| 2014/0350724 A1 | 11/2014 | Johst et al. | |

FOREIGN PATENT DOCUMENTS

| | | | |
|---|---|---|---|
| CN | 206509716 U | 9/2017 | |
| CN | 107363523 A | 11/2017 | |
| CN | 107414474 A | 12/2017 | |
| EP | 3 195 991 A1 | 7/2011 | |
| EP | 2 607 685 A1 | 6/2013 | |
| EP | 2 653 273 A1 | 10/2013 | |
| EP | 3 163 071 A1 | 5/2017 | |
| JP | H01 103240 A | 4/1989 | |
| JP | H01 216730 A | 8/1989 | |
| JP | H06 206128 A | 7/1994 | |
| KR | 2013 0026039 A | 3/2013 | |

\* cited by examiner

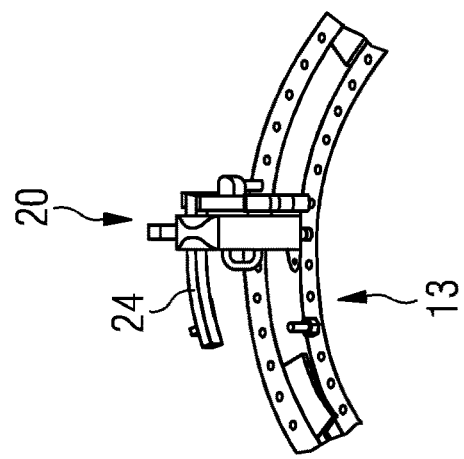
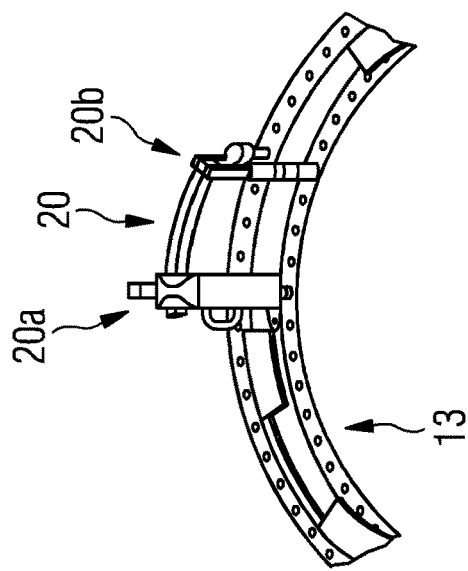
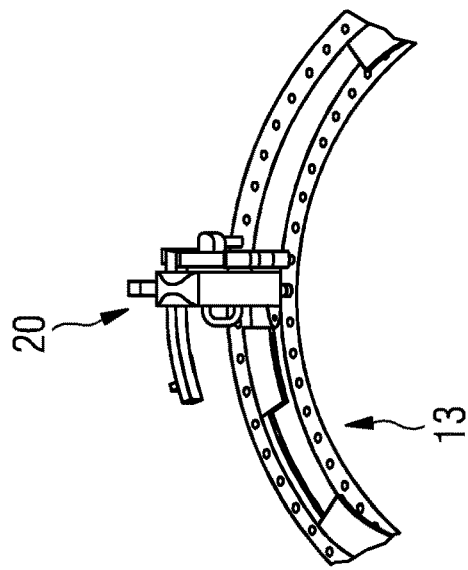
FIG 14

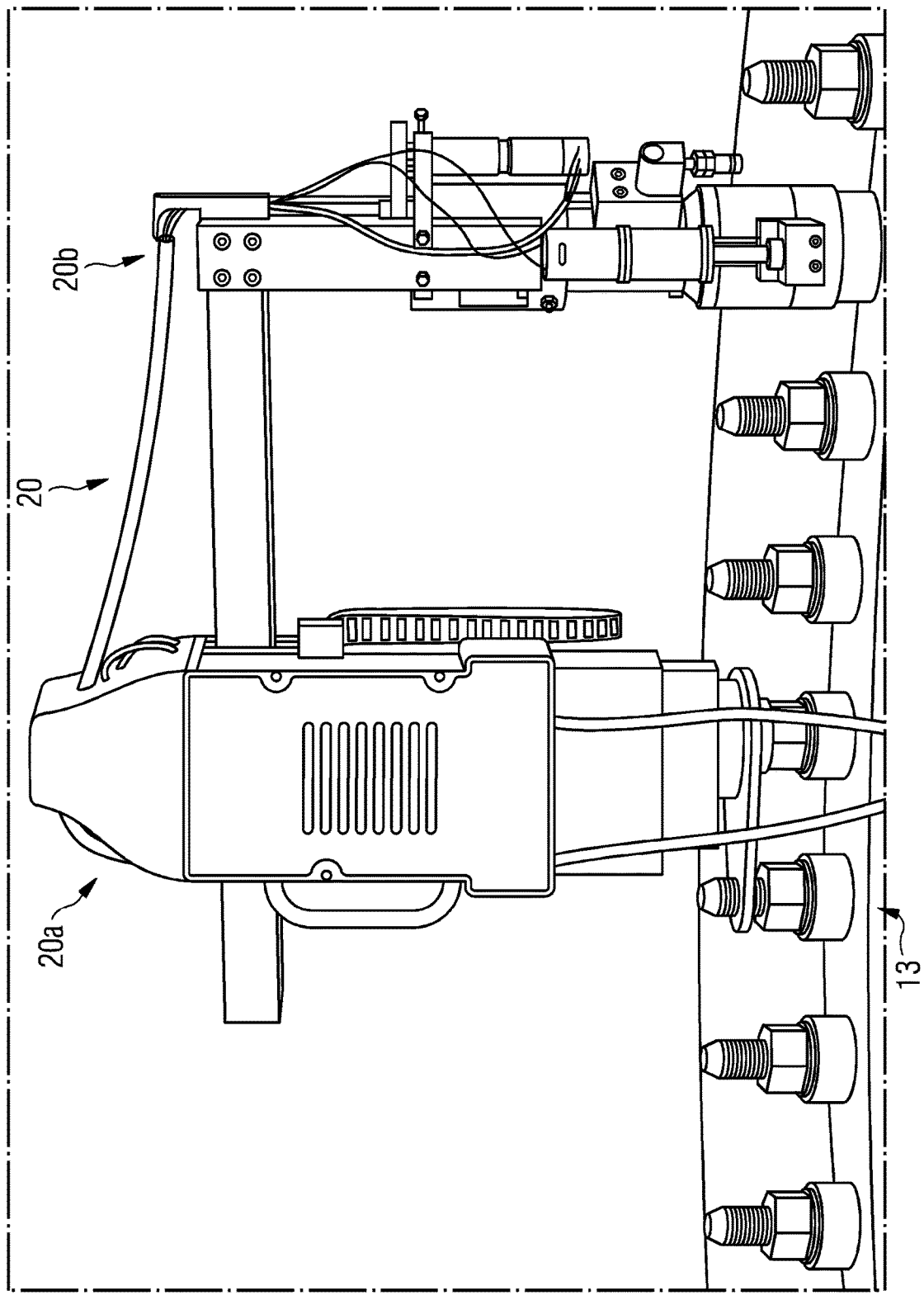

AUTOMATED BOLT TENSIONING ROBOT

CROSS-REFERENCE TO RELATED APPLICATIONS

This application claims priority to PCT Application No. PCT/EP2020/060419, having a filing date of Apr. 14, 2020, which claims priority to EP Application No. 19188050.9, having a filing date of Jul. 24, 2019, and U.S. Ser. No. 62/835,583, having a filing date of Apr. 18, 2019, the entire contents all of which are hereby incorporated by reference.

FIELD OF TECHNOLOGY

The following relates to a method and a device for automated bolt tensioning and more specifically to embodiments of a method and device for tightening bolts on a wind turbine or other machines requiring periodic bolt tightening and maintenance.

BACKGROUND

Tightening bolts that connect wind turbine main components, particularly during maintenance or service of the wind turbine, typically requires multiple technicians to execute the task using a hydraulic tension/torque device. The manual process using the hydraulic tension/torque device is slow and poses ergonomic challenges to technicians as well as challenges to the safety of the technicians. Further, conventional hydraulic torque/tensioning devices do not collect performance data from the bolts themselves.

SUMMARY

An aspect relates to providing a possibility to automatically tighten bolts that connect wind turbine main components, and especially collect performance data from the bolts themselves.

An aspect relates to an automated (or automatic) bolt tensioner, particularly an autonomous bolt tensioner, comprising:

A first unit configured to be releasably secured to a first subset of existing bolt connections of a further assembly. As said above, the first unit is configured to be releasably secured to existing bolt connections, for example, bolt connections between a rotor blade and a blade-bearing of the hub, particularly the blade bearing of a pitching mechanism of the wind turbine blades.

A second unit configured to tighten a second subset of the existing bolt connections of the further assembly, for example, the second unit includes a bolt tensioning assembly for tightening an existing bolt connection.

A slide arm connecting the second unit to the first unit, wherein the first unit and the second unit are each movable so that the automated bolt tensioner can automatically advance to adjacent existing bolt connections adjacent to the first subset and/or to the second subset of existing bolt connections. Thus, the slide arm facilitates (generally horizontal) movement of the first unit and the second unit.

Another aspect relates to an automatic bolt tensioner (e.g., as described above), wherein the above-described units are or comprise legs. The following description can be regarded as an additional (or alternative) description of the bolt tensioner according to the invention. The bolt tensioner comprising:

a first leg including an attachment located for threading the first leg onto a first existing bolt connection of a further assembly, a second leg including a bolt tensioning assembly for tightening a second existing bolt connection of the further assembly, and a slide arm connecting the first leg and the second leg, wherein actuation of the slide arm permits movement of the second leg with respect to the first leg to automatically advance the second leg to a third existing bolt connection for tightening the third existing bolt connection, while the first leg remains threadably attached to the first existing bolt connection.

The automated bolt tensioning device is a tool that can be temporarily placed onto the bolt connections. The device is a robot capable of programmable movement along existing bolt connections connecting two or more wind turbine components together.

Generally, the two above-described aspects refer to a similar invention. The first unit can be regarded as the first leg (so that in the following, for the expressions "first unit", the expression "first leg" could also be used). Also, the second unit can be regarded as the second leg (so that in the following, for the expressions "second unit", the expression "second leg" could also be used).

Thus, the first unit (the first leg) is configured to be releasably secured (via the attachment means or attachment) to a first subset of existing bolt connections (e.g., a first existing bolt connection) of a further assembly. The second unit (the second leg) is configured to tighten (with a bolt tensioning assembly) a second subset of the existing bolt connections (e.g., a second existing bolt connection of the further assembly.

The slide arm connecting the first unit (leg) and the second unit (leg), wherein the first unit and the second unit are each movable (by the slide arm). By moving the units (legs) by the slide arm, different bolt connections can be reached.

In an exemplary embodiment, the first unit is a first leg that includes an attachment means or attachment located at a bottom end of the first leg for threading the first leg onto a first existing bolt connection. The attachment means or attachment threadably attaches the first unit to a stud protrusion of existing bolt connections. A motor controls the threading of the first unit to existing bolt connections. Optionally, the attachment means or attachment includes an extension that couples to a stud protrusion adjacent the first existing bolt connection or added support during an anchoring process of anchoring the device down as the second unit tightens a bolt connection and advances to a further bolt connection.

The second unit comprises an adaptor that is dimensioned to fit to the nut which is to be tightened. Optionally the robot may be able to change autonomously adaptors based on a size of the upcoming one of the be tightened nuts in case different size nuts are present on the ring of bolt connections.

The automatic bolt tensioner uses the existing turbine structure (e.g., the bolts themselves) to physically "walk" from bolt to bolt, and does not utilize auxiliary systems (e.g., rails, platforms, etc.) to maneuver itself in the working environment. Furthermore, the device is designed to operate in an assembled wind turbine or any other assembled machine, different to usual robots in manufacturing that are operated in an assembly or manufacturing workshop. The automatic bolt tensioner works on the blade studs, which are the studs that hold the wind turbine blade onto the blade bearing, which is then mounted onto the hub.

Another aspect relates to a method of automatically tightening existing bolt connections on a wind turbine tower with the automatic bolt tensioner according to the invention.

A typical method comprises the following steps:
(Preparing the Automatic Bolt Tensioner)

According to a first preparing step, the first unit is connected to one or two bolt connections (the first subset of existing bolt connections) to anchor the device. The connection involves a hollow, internally threaded attachment means or attachment that threads onto the external threads of a stud protrusion of an existing bolt connection. The actual position of the first unit is called "anchoring position". It may vary during a later bolt tensioning action.

According to a second preparing step, the second unit is placed over a second subset of existing bolt connections (e.g., a further bolt and nut of a further bolt connection) a distance away from the two bolt connections occupied by the first unit.
(Bolt Tensioning Method)

Once in position, the following steps could be repeatedly performed for bolt tensioning. A positioned bolt tensioner does not necessarily need to be positioned again once the preparing procedure has been finished and the bolt tensioning method can be performed from time to time to be secure that all bolts are correctly tensioned.

Lower the second unit onto the further bolt connection (the second subset of existing bolt connections) to tighten the nut.

After the further bolt connection is tightened:

Lift the second unit away from the bolt connection and then move it (generally horizontally) by actuation of the slide arm over the next bolt connection (a third subset of existing bolt connections), while the first unit remains in the anchoring position.

Lower the second unit onto this next bolt connection (the third subset of existing bolt connections) to tighten the next nut.

This progression by the second unit can be done for a few bolt connections (for example up to five, up to four, or up to three bolt connections, and at least two, at least three, or at least four connections) depending on a length of the slide arm between the first unit and the second unit.

To reach further positions, the following steps can be performed:

Loosen the first unit from its position.

Lift the first unit (in Z axis direction), and move it a few bolts closer to the second unit.

Lower the first unit and connect it again onto a subset of existing bolt connections (e.g., two bolts). This subset of existing bolt connections (these two bolts) now act as solid basement for the next operating steps of the robot, i.e., a new anchoring position. During the repositioning of the first unit, the second unit remains in tight contact with a bolt connection.

As said above, the whole process can start over again to service the existing bolt connections, that is, the nut and the bolt, of the component.

Once the device is placed by the technician at a first location of a ring of bolts, the device may crawl around the circle of bolts without further manual interaction. In some cases, such as a connection between a rotor blade and hub, the device will have to periodically pause its operation until a technician manually pitches the rotor blade to a new position to access more bolts due to obstacles in a travel path of the device. For other joints, such as tower connections where there are no such obstacles, the device would be able to travel the full circle unimpeded.

In an embodiment, the device also collects data to determine if the nuts/bolts are loosening between service intervals. The device may submit collected data, after tightening bolt connections, to a supervisory controller, so that this information can be stored in a central service database. Data in such a service database can then be used to schedule service intervals. Data collection on nut/bolt can be used to potentially extend service intervals for particular bolted connections (e.g., if a joint remains tight year after year based on data collection it may only need to be inspected/re-tightened every X years instead of every one year). The device regulates and verifies that the proper values are used to tighten each bolt and achieved during the tightening process.

An advantage of the invention is that the device reduces a number of technicians required to perform bolt tightening tasks from two to one and collects data to determine if the nuts/bolts are loosening between service intervals. Additionally, the device is a fully-functional automated device capable of repeatedly tightening bolts within various locations of an operational wind turbine (e.g., hub, tower, etc.) to a specified tension range. The device may include obstacle detection, alignment, an operational graphical user interface, and nut rotation data acquisition for reduced turbine preventative maintenance cost.

The steps of the method according to the invention can be completely or partially realized as software functions running on a processor of a computing device. A realization largely in the form of software modules can have the advantage that an existing wind turbine controlling system (connected with the robot via a data connection) can be updated, with relatively little effort, to install and run these units of the present application. A such prepared wind turbine could easily control a robot according to the invention so that the robot just needs actuators and generally no individual controller. The method of the invention is also achieved by a computer program product (non-transitory computer readable storage medium having instructions, which when executed by a processor, perform actions) with a computer program that is directly loadable into the memory of an inspection device or a wind turbine controlling system, and which comprises program units to perform the steps of the inventive method when the program is executed by the inspection device or the wind turbine controlling system. In addition to the computer program, such a computer program product can also comprise further parts such as documentation and/or additional components, also hardware components such as a hardware key (dongle etc.) to facilitate access to the software.

A computer readable medium such as a memory stick, a hard-disk or other transportable or permanently-installed carrier can serve to transport and/or to store the executable parts of the computer program product so that these can be read from a processor unit of an inspection device or a wind turbine controlling system. A processor unit can comprise one or more microprocessors or their equivalents.

Embodiments and features of the invention are given by the dependent claims, as revealed in the following description. Features of different claim categories may be combined as appropriate to give further embodiments not described herein.

In an exemplary embodiment the further assembly comprises two components of a wind turbine that are connected via a plurality of bolt connections. Such bolt connections may require tensioning during service of the further assembly. Thus, the automatic bolt tensioner is an autonomous tool that will be used for an assembly that already has been installed and has been operated. The automatic bolt tensioner may be placed onto the further assembly such that it may operate on its own to tension the blot connections of an already assembled further assembly.

In an exemplary embodiment the first subset of existing bolt connections to which the first unit may be releasably secured may comprise a single one or two bolt connections. Therefore, the automated bolt tensioner may provide temporarily a fixed connection to one, two or more of the first subset of existing bolt connections.

In an exemplary embodiment the second subset of existing bolt connections which may be tightened by the second unit may comprise a plurality of bolt connections, but at a specific point in time only a single bolt connection of the second subset may be tightened. Therefore, tightening of bolt connections may be performed consecutively, one after another.

In an embodiment, the device may (whether or not being controlled by a controller of the wind turbine) interact with the wind turbine controller. Once the device identifies an obstruction or whether its orientation cannot guarantee safe processing of the work, for example if the device would be upside down, it could demand from the turbine controller to activate a rotation of the main rotor, and/or the yawing motor, and/or the pitching mechanism, so that the bolt connections will be repositioned so that the robot can continue to autonomously tighten further bolt connections.

In an exemplary embodiment, the existing bolt connections may be arranged in a ring. A plane of the ring in which the bolt connections are arranged may be defined by an X and Y axis, while a direction perpendicular to this plane may be defined as the Z axis.

In an embodiment, the slide arm is a slide rail that may also be referred to as an X slide because the movement generally occurs along the X axis, wherein a X axis and a Y axis define a plane in which the bolt connections are arranged. In an embodiment, a motor controls the actuation of the slide arm. Further, the slide arm can be customized to the dimension of the bolted joint being tightened; the device can utilize the existing wind turbine hardware as an anchor to "walk" from one bolt to the next, or skip bolts in between for larger tightening intervals.

In an exemplary embodiment, the first unit includes an attachment means or attachment that threadably attaches the first unit to a stud protrusion of the existing bolt connections, and the attachment means or attachment includes an extension that couples to a stud protrusion adjacent the first existing bolt connection.

In an exemplary embodiment, the second unit includes a tensioner threader for threading a tensioner onto a stud protrusion of the existing bolt connections, a tensioner for tensioning the existing bolt connections, and a torque application device for applying torque to a nut of the existing bolt connections after a bolt has been tensioned by the tensioner. In an embodiment, the above-mentioned tensioning assembly includes the tensioner threader for threading a tensioner onto a stud protrusion of existing bolt connections, encoders, a tensioner for tensioning the existing bolt connections, and a torque application device for applying torque to a nut of the existing bolt connections after a bolt has been tensioned by the tensioner.

In an exemplary embodiment, the first unit includes a Z axis slide permitting a vertical movement of the second unit and the first unit. So respective units can move up and down in respect of the bolt connections. In an embodiment, the second unit is moved along the Z axis by actuating the Z slide mounted to the first unit because the slide arm connects the second unit to the first unit. When the first unit is releasably secured to an existing bolt connection for example by connecting to a thread of a threaded end of one of the bolts, the Z slide permits a vertical movement of the second unit from a position above a bolt connection to a position of contact with the bolt connection, and then back to a position above the bolt connection. Likewise, when the second unit remains in tight contact with an existing bolt connection (e.g., a bolt connection just tightened) the Z slide permits a vertical movement of the first unit from a position of contact with the bolt connection to a position above a first bolt connection. In other words, the Z slide permits the first unit and/or the second unit to be lowered onto bolt connections of the wind turbine tower. A motor—or one motor for each of the units—controls the actuation of the Z slide.

An exemplary embodiment comprises one or more sensors that are configured to detect obstacles along a travel path of the automated bolt tensioner as the automated bolt tensioner automatically advances to adjacent existing bolt connections. In an embodiment, once such a sensor detects an obstacle along the travel path of the device, the device will pause its operation. In an embodiment, also a signal is provided to an operator person or a control device. The one or more sensors include an infrared sensor and/or a camera (e.g., canny edge detection) positioned on the second unit, using a sensor mount, for example.

An exemplary embodiment comprises a control unit that is configured to control a movement of the first unit and the second unit, wherein the control unit (and possibly also other electronics) is contained within a housing attached to the first unit. The control unit includes at least one RFID antenna for emitting an electromagnetic field to energize a RFID tag associated with each of the existing bolt connections, further wherein data received from the energized RFID tag is used to analyze whether the existing bolt connection have loosened over time.

In an embodiment, the data collected can use RFID tags and performance indicators from the robot to uniquely track the bolt being tightened and to what pressure/tension/torque value. A singe RFID per ring could also be used, but using one RFID tag per bolt ensures a unique identifier per bolt, which is helpful in case of a bolt replacement (i.e., would require new RFID tag) and reduces complexity of programming the device. It also ensures that technicians do not accidentally re-tighten a bolt that was previously tightened (the robot is programmed to avoid duplicate tightenings within a certain time frame).

In an exemplary embodiment, the existing bolt connections are located on an operational wind turbine.

In an exemplary embodiment, the slide arm is curved and has a curvature that corresponds to a curvature of the existing bolt connections on a wind turbine component of the wind turbine. In an exemplary embodiment, the device is designed/optimized for the blade-to-blade-bearing connection, such that the slide arm is a curved rail designed to match a curvature of the bolted joints of the blade-to-blade bearing connection. In other embodiments, the slide arm could be exchanged for different sizes/curvatures so the device can tighten other bolted connections (e.g., tower flanges). As a result, the slide arm is curved and has a curvature that corresponds to a curvature of the existing bolt connections on a wind turbine component of the wind turbine.

In an exemplary embodiment, the actuation of the slide arm permits movement of the first leg with respect to the second leg to automatically advance the first leg to another existing bolt connection in a direction towards the second leg, while the second leg remains in contact with the third bolt connection.

In an exemplary embodiment, a Z axis actuator permits a vertical movement of the second leg from a position above the second bolt connection to a position of contact with the second bolt connection.

The actuation of the Z axis actuator permits a vertical movement of the first leg from a position above the first bolt connection to a position of contact with the first bolt connection.

In an exemplary embodiment, the bolt tensioning assembly includes a tensioner threader for threading a tensioner onto a stud protrusion of existing bolt connections, possibly encoders, a tensioner for tensioning the existing bolt connections, and a torque application device for applying torque to a nut of the existing bolt connections after a bolt has been tensioned by the tensioner. In an embodiment, the tensioning assembly forms, at least partly, the second leg of the device. In an embodiment, a motor controls the tensioning threader for threading the tensioner on the bolt to be tightened, and a separate motor controls the torque application device for turning the nut after the bolt has been tensioned.

In an alternative embodiment, the task could similarly be performed by a robotic arm centrally mounted relative to the bolted joint being tightened. The centrally mounted robotic arm may be larger and heavier than the device described above and may be operated with a support system (e.g., rail) for such a centrally mounted robot.

The foregoing and other features of construction and operation will be more readily understood and fully appreciated from the following detailed disclosure, taken in conjunction with accompanying drawings.

BRIEF DESCRIPTION

Some of the embodiments will be described in detail, with reference to the following figures, wherein like designations denote like members, wherein:

FIG. 14 depicts a sequence of movement of the automated bolt tensioning device, in accordance with embodiments of the present invention;

FIG. 16 depicts the automated bolt tensioning device placed on studs, in accordance with embodiments of the present invention.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents and "comprising" does not exclude other steps or elements, unless the context clearly dictates otherwise.

The mention of a "unit" or a "device" does not preclude the use of more than one unit or device. Objects in the diagrams are not necessarily drawn to scale.

Figure 1:
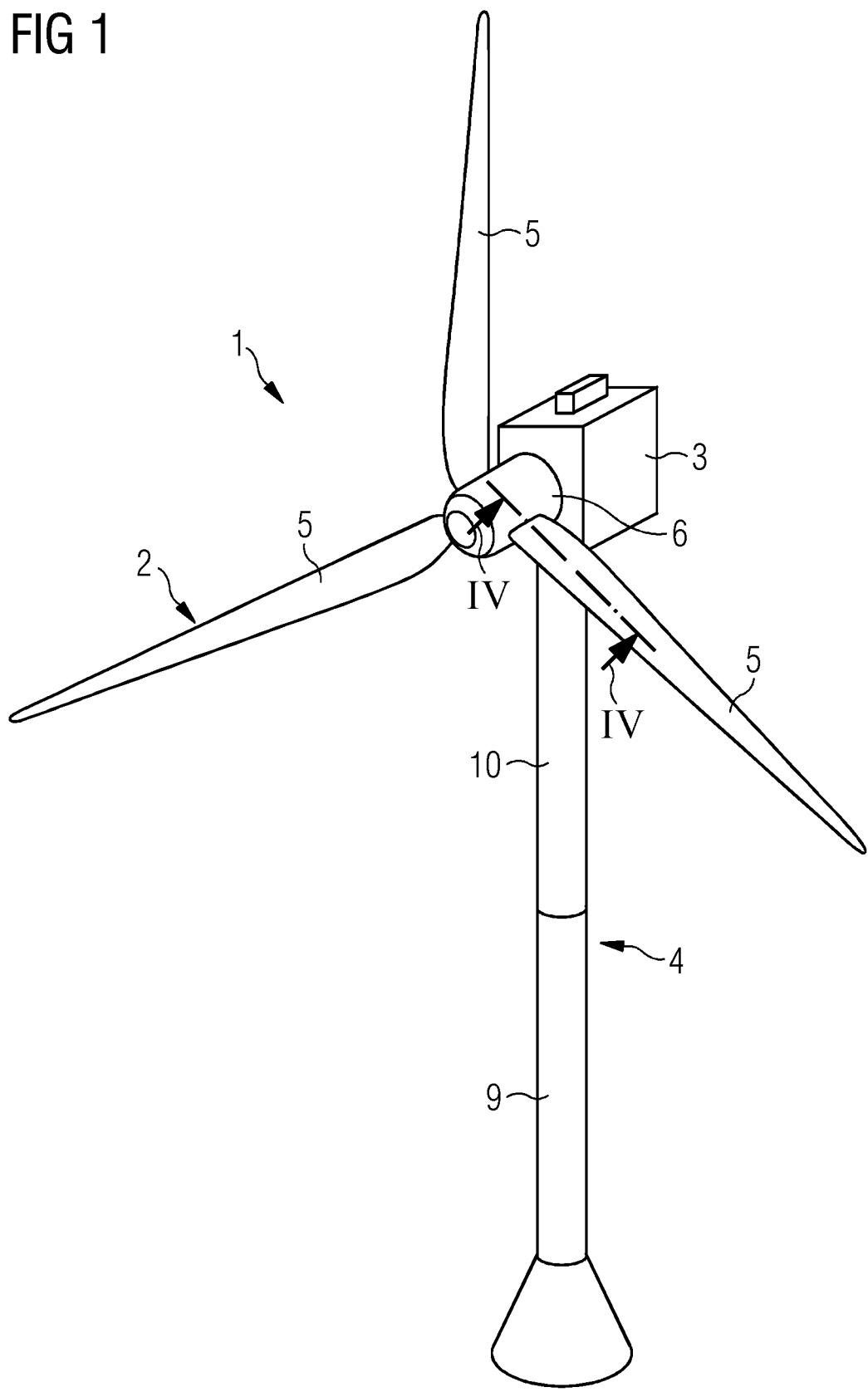
FIG. 1 depicts an example of a connection where bolts and nuts will be used in a wind turbine tower, in accordance with embodiments of the present invention.

FIG. 1 depicts an example of a connection where bolts and nuts will be used in a wind turbine 1, in accordance with embodiments of the present invention. The wind turbine 1 includes one or more rotor blades 5 (on a rotor 2) that connect to a hub 6 of the wind turbine 1. The hub 6 is connected to a nacelle 3 that is atop a wind turbine tower 4. The wind turbine tower 4 may be constructed in multiple sections, such as tower section 9 and tower section 10.

Figure 2:
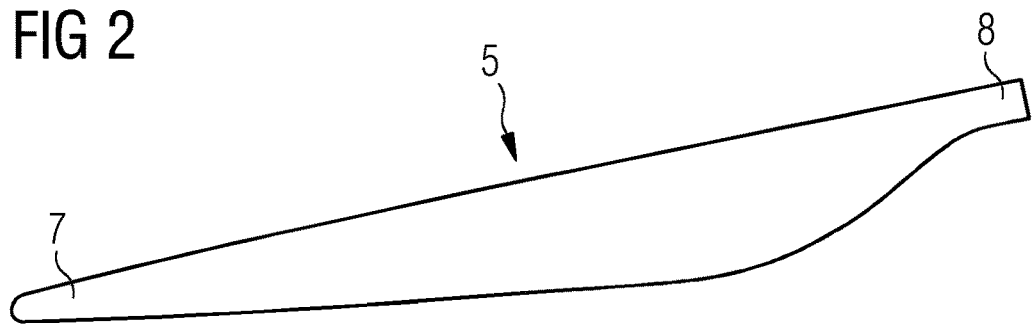
FIG. 2 depicts a rotor blade of a wind turbine.

FIG. 2 depicts a rotor blade 5 of the wind turbine 1. The rotor blade 5 includes a tip end 7 and a root end 8.

Figure 3:
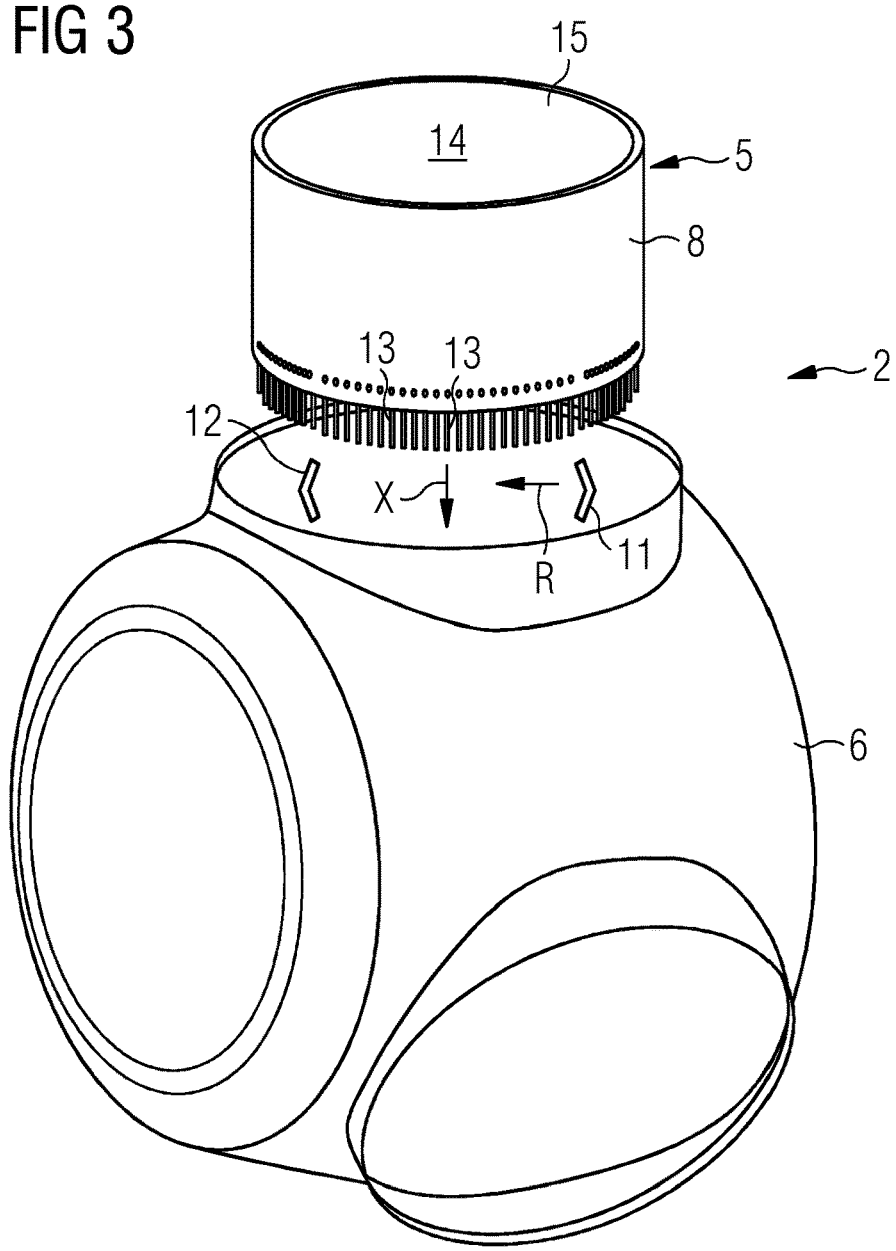
FIG. 3 depicts a schematic view of a root end of the rotor blade being connected to a hub of the wind turbine.

FIG. 3 depicts a schematic view of the root end 8 of the rotor blade 5 being connected to a hub 6 of the wind turbine 1 (the rotor 2). A plurality of bolt connections 13 attach the rotor blade 5 to the hub 6. In particular, the rotor blade 5 is attached via bolted connections 13 to a blade-bearing of the hub 6. These bolted connections 13 need to be tightened over time, particularly during service of the wind turbine. Other types of bolted connections 13 connecting wind turbine components include tower flanges of two wind turbine tower sections. For example, connections of the wind turbine 1 that are connected with a ring of bolts and corresponding nuts. Furthermore, such connections may be present between the two rotor components or between a rotor component and a rotating part of a bearing arrangement. Additionally, for a yawing component such bolted connections 13 may be used to connect two components of the wind turbine 1.

Figure 4:
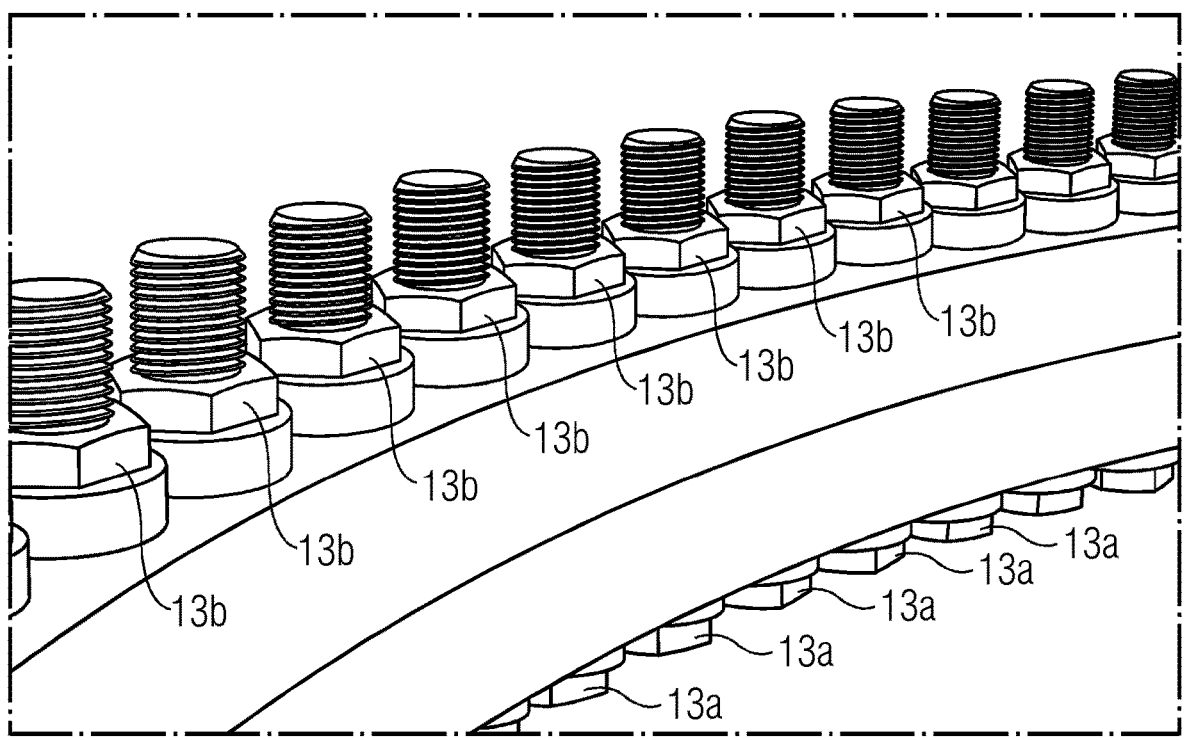
FIG. 4 depicts a section of an assembled ring for a wind turbine blade connected to the hub, in accordance with embodiments of the present invention.
Figure 5:
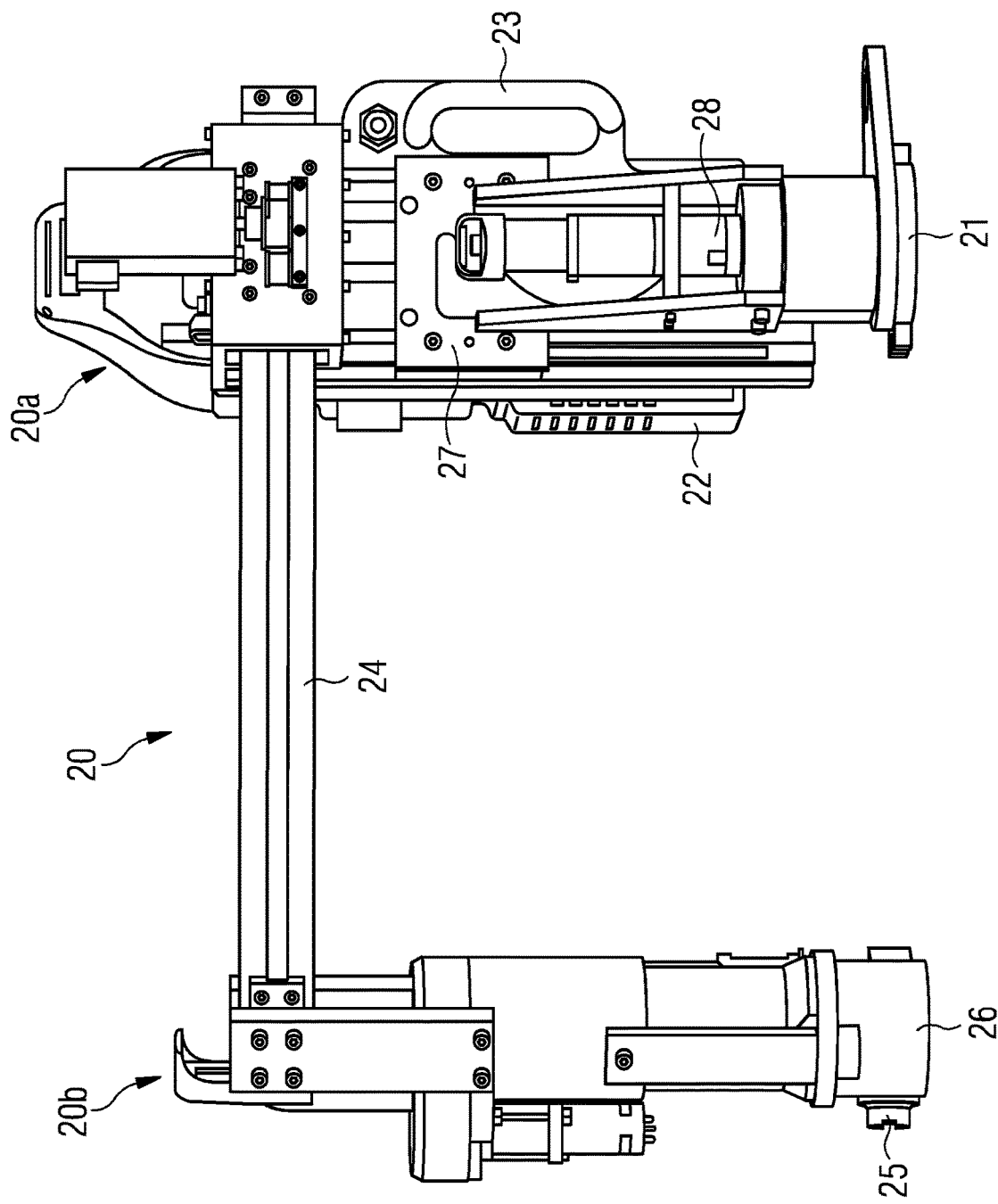
FIG. 5 depicts an automated bolt tensioning device, in accordance with embodiments of the present invention.

FIG. 4 depicts a section of an assembled ring for a wind turbine blade 5 connected to the hub 6 (see e.g., FIG. 3), in accordance with embodiments of the present invention. The section of the assembled ring includes a plurality of bolts 13a with a thread at the end, together with nuts 13b that are screwed on the threaded bolts 13a. These are the nuts 13b that will need to be tightened from time to time. Embodiments of the present invention include an automated bolt tensioning device 20 that automatically tightens existing bolt connections 13 (i.e., threaded bolt 13a and corresponding nut 13b) of an operational wind turbine 1, such as those shown in FIG. 4. As depicted in FIG. 4, a configuration is a circular arrangement of bolts 13a. Also, the distance of the bolts 13a may be substantially equidistant to another throughout the complete ring.

FIGS. 5-13 depict various views of an automated bolt tensioning device 20, in accordance with embodiments of the present invention. For references to bolt connections or the wind turbine see the preceding figures. The automated bolt tensioning device 20 is a tool that can be temporarily placed onto the bolt connections 13. The device 20 is a robot capable of programmable movement along existing bolt connections 13 connecting two or more wind turbine components together. The device 20 reduces a number of technicians required to perform bolt tightening tasks from two to one, and collects data to determine if the nuts/bolts are loosening between service intervals. Additionally, the device 20 is a fully-functional automated device capable of repeatedly tightening bolts 13a within various locations of an operational wind turbine 1 (e.g., hub, tower, etc.) to a specified tension range. The device 20 may include obstacle detection, alignment, an operational graphical user interface, and nut rotation data acquisition for reduced turbine preventative maintenance cost.

The device 20 includes a first unit 20a and a second unit 20b. The first unit is configured to be releasably secured to existing bolt connections 13, for example, bolt connections 13 between a rotor blade 5 and a blade-bearing particularly the blade bearing of a pitching mechanism of the wind turbine blades 5 of the hub 6. In an exemplary embodiment, the first unit 20a is a first leg 20a that includes an attachment means or attachment 21 (e.g., an attachment base 21) located at a bottom end of the first leg 20a for threading the first leg 20a onto a first existing bolt connection 13. The attachment means or attachment 21 threadably attaches the first unit 20a to a stud protrusion of existing bolt connections 13. A motor controls the threading of the first unit 20a to existing bolt connections 13. Optionally, the attachment means or attachment 21 includes an extension that couples to a stud protrusion adjacent the first existing bolt connection 13 or added support during an anchoring process of anchoring the device 20 down as the second unit 20b tightens a bolt connection 13 and advances to a further bolt connection 13.

Further, the first unit 20a includes a Z axis slide 27 permitting a vertical movement of the second unit 20b and the first unit 20a. So respective units can move up and down in respect of the bolt connections 13. The second unit 20b is moved along the Z axis by actuating the Z slide 27 mounted to the first unit 20a because the slide arm 24 connects the second unit 20b to the first unit 20a. When the first unit 20a is releasably secured to an existing bolt connection 13 for example by connecting to a thread of a threaded end of one of the bolts, the Z slide 27 permits a vertical movement of the second unit 20b from a position above a bolt connection 13 to a position of contact with the bolt connection 13, and then back to a position above the bolt connection 13. Likewise, when the second unit 20b remains in tight contact with an existing bolt connection 13 (e.g., a bolt connection 13 just tightened) the Z slide 27 permits a vertical movement of the first unit 20a from a position of contact with the bolt connection 13 to a position above a first bolt connection 13. In other words, the Z slide 27 permits the first unit 20a and/or the second unit 20b to be lowered onto bolt connections 13 of the wind turbine tower. A motor—or one motor for each of the units—controls the actuation of the Z slide 27.

Further, the first unit 20a comprises an electronic 22 to control the movements of the device 20 and an ergonomic handle 23 to manually carry and apply the device 20 to a bolt connection 13.

The second unit 20 is configured to tighten the existing bolt connections 13. For example, the second unit 20a includes a bolt tensioning assembly for tightening an existing bolt connection 13. The tensioning assembly includes a tensioner threader for threading a tensioner 26 (e.g., a TenTec Tensioner) onto a stud protrusion of existing bolt connections 13, encoders, a tensioner 26 for tensioning the existing bolt connections 13, and a torque application device for applying torque to a nut 13b of the existing bolt connections 13 after a bolt 13a has been tensioned by the tensioner 26. The tensioning assembly forms, at least partly, the second leg 20b of the device 20. A motor controls the tensioning threader for threading the tensioner 26 on the bolt 13a to be tightened, and a separate motor controls the torque application device for turning the nut 13b after the bolt 13a has been tensioned.

The second unit 20b comprises an adaptor that is dimensioned to fit to the nut 13b which is to be tightened. Optionally the robot may be able to change autonomously adaptors based on a size of the upcoming one of the to be tightened nuts 13b in case different size nuts are present on the ring of bolt connections 13. Thus, the robot is able to change adaptors autonomously in case different size nuts are present on the ring of bolt connections 13. This change is especially based on the size of a nut 13b that has to be tightened next.

Further, the second unit 20b comprises a sensor mount 25 to mount a number of sensors on the second unit 20b.

The device 20 also includes a slide arm 24 connecting the second unit 20b to the first unit 20a. The slide arm 24 facilitates generally horizontal movement of the first unit 20a and the second unit 20b. For instance, the first unit 20a and the second unit 20b are each movable so that the device 20 can automatically advance to adjacent existing bolt connections 13. The slide arm 24 is a slide rail that may also be referred to as a X slide 24 because the movement generally occurs along the X axis, wherein a X axis and a Y axis define a plane in which the bolt connections 13 are arranged. A motor controls the actuation of the slide arm 24. Further, the slide arm 24 can be customized to the dimension of the bolted joint being tightened; the device 20 can utilize the existing wind turbine hardware as an anchor to "walk" from one bolt to the next, or skip bolts 13a in between for larger tightening intervals.

The way the device 20 automatically advances to tighten bolt connections 13 will now be described, with reference to FIG. 14. The left picture shows the starting at a bolt that can be designated "bolt 1" (e.g., a Pitch Ramp). There is one pitch ramp installed on each blade. This item is a steel ramp structure bolted to the blade bearing, and features three holes in the ramp to allow for a hydraulic piston to drop into any of the three holes to provide a mechanical locking mechanism to prevent unintentional movement of the blade. The picture in the middle shows a state where the tensioner moves to the fifth bolt (seen from bolt 1). The right picture shows a state where the tensioning is done. Once done tensioning, the threader follows. This action of the three pictures is repeated. The picture further shows marked areas of the bolts. The robot can measure how strong the bolts had been fastened or if there have been loosened bolts. These areas could be identified and e.g., shown on a screen marked with colors where green can designate e.g., oil absorber pads (often installed in the sides of the blade bearing, designed to absorb any excess water/grease/oil which could be introduced into the hub area), yellow means "questionable" and red mark "no-go" states.

Figure 11:
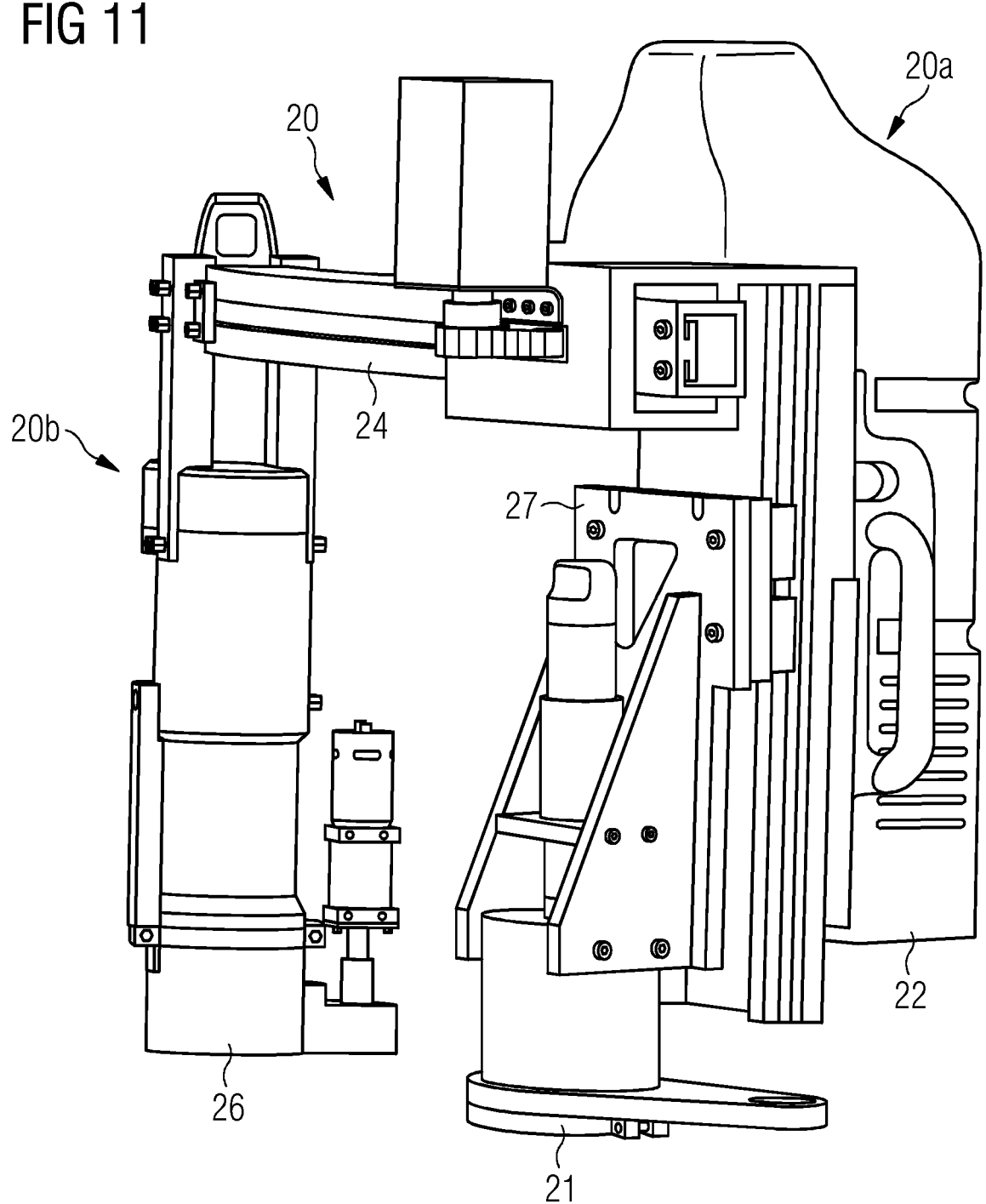
FIG. 11 depicts a front, perspective view of the automated bolt tensioning device of FIG. 10, in accordance with embodiments of the present invention.
Figure 12:
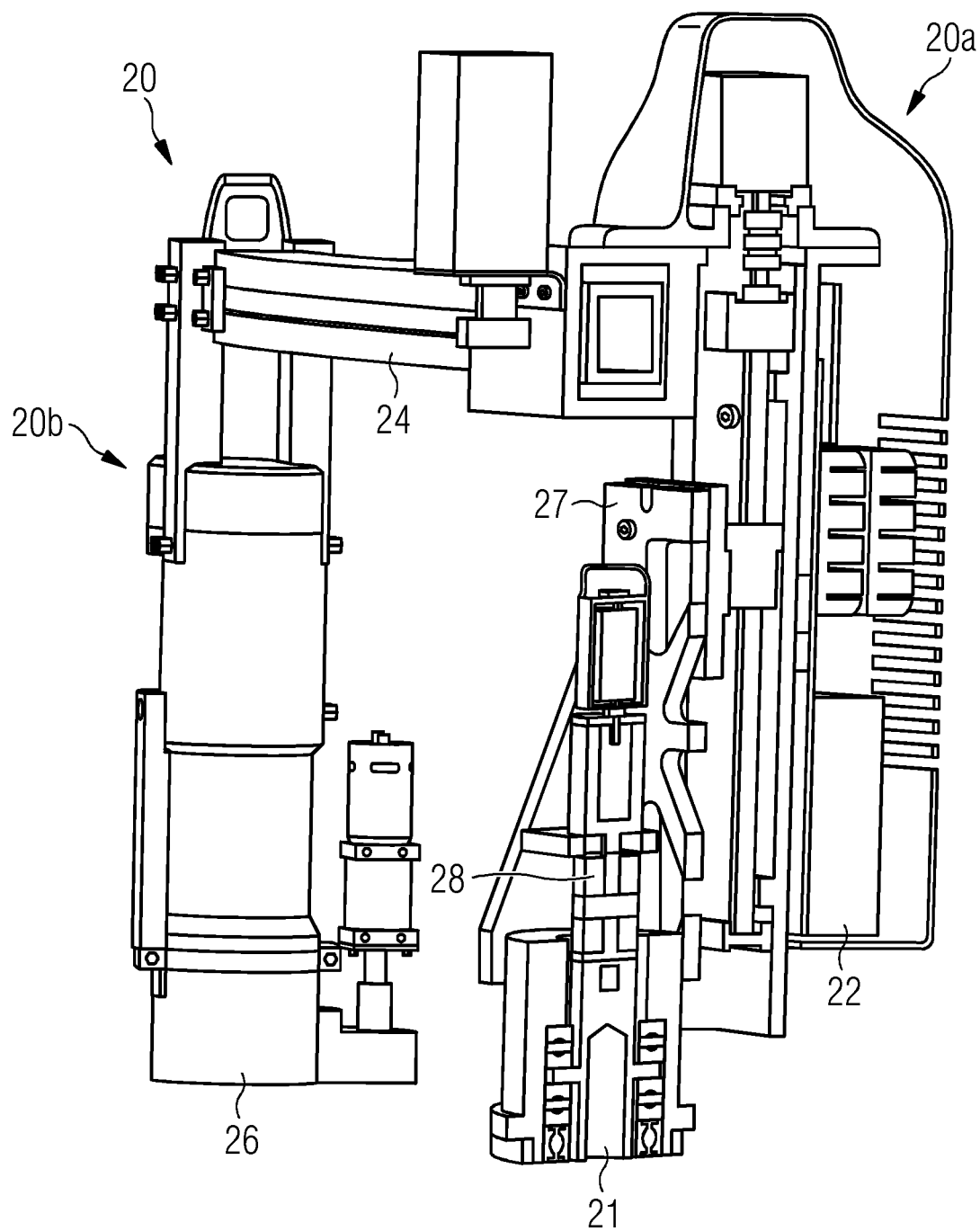
FIG. 12 depicts a full cross-sectional view of a first unit of the automated bolt tensioning device of FIG. 11, in accordance with embodiments of the present invention.
Figure 13:
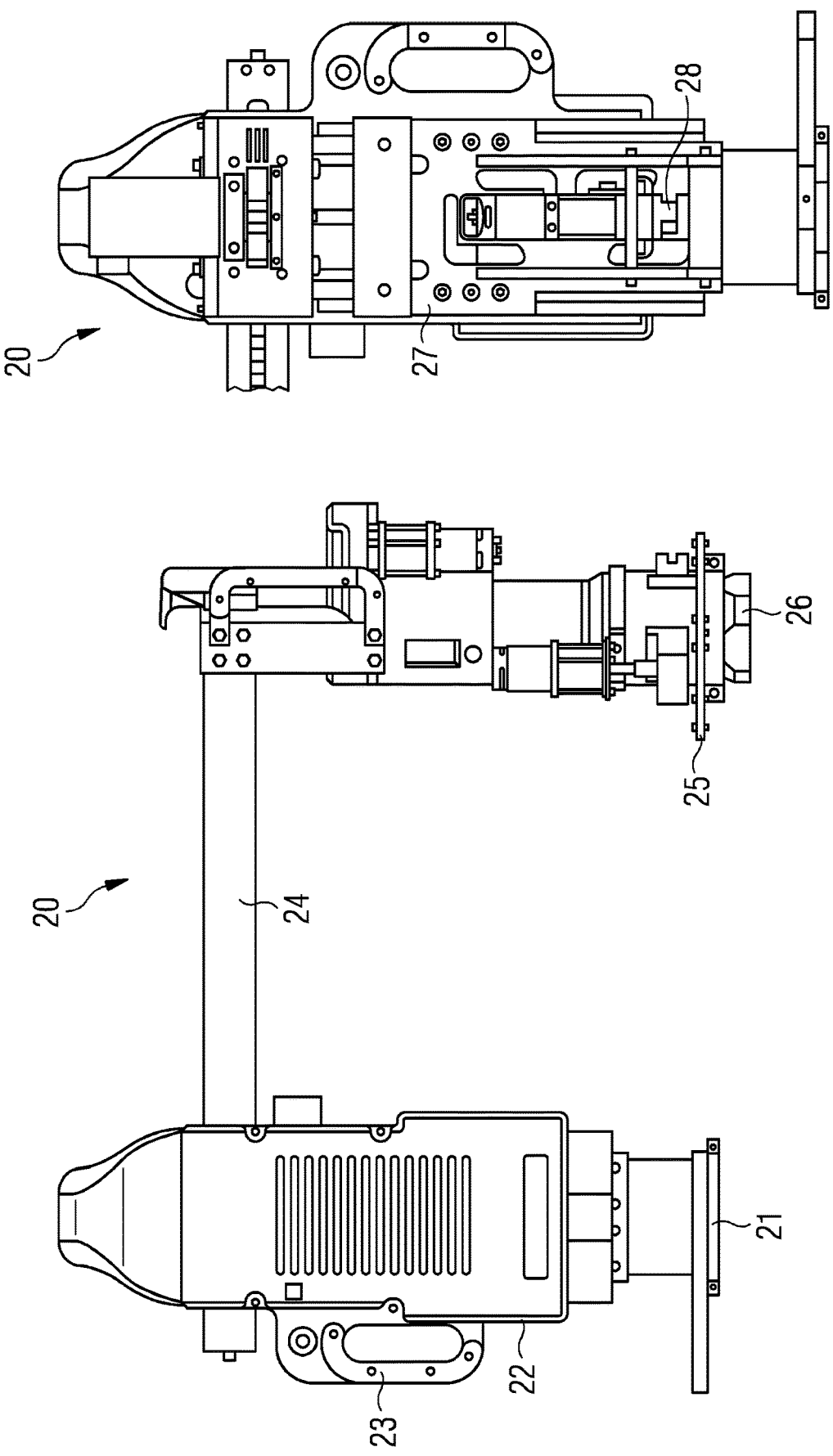
FIG. 13 depicts a schematic view of the automated bolt tensioning device, in accordance with embodiments of the present invention.

The first unit 20a is connected to one or two bolt connections 13 to anchor the device 20. The connection involves a hollow, internally threaded attachment means or threaded attachment 21 (see e.g., one of FIGS. 5-13) that threads onto the external threads of a stud protrusion of an existing bolt connection 13, as shown in FIG. 12. The second unit 20b is placed over a further bolt 13a and nut 13b of a further bolt connection 13 a distance away from the two bolt connections occupied by the first unit 20a. Once in position, the second unit 20b is then lowered onto the further bolt connection 13 to tighten the nut 13b. After the further bolt connection 13 is tightened, the second unit 20b is lifted away from the bolt connection 13 and then moved generally horizontally by actuation of the slide arm 24 over the next bolt connection 13; the first unit 20a remains in the anchoring position. The second unit 20b is lowered onto this next bolt connection 13 to tighten the next nut 13b. This progression by the second unit 20b can be done for a few bolt connections 13 for example up to five, up to four, or up to three bolt connections 13, and at least two, at least three, or at least four connections depending on a length of the slide arm 24 between the first unit 20a and the second unit 20b. Eventually, the first unit 20a is loosened from its position, lifted (in Z axis direction), moved a few bolts closer to the second unit 20b, and then lowered and connected again onto two bolts. These two bolts now act as solid basement for the next operating steps of the robot. During the repositioning of the first unit 20a, the second unit 20b remains in tight contact with a bolt connection 13. The whole process can start over again to service the existing bolt connections 13, that is, the nut and the bolt, of the component.

Once the device 20 is placed by the technician at a first location of a ring of bolts, the device may crawl around the circle of bolts without further manual interaction. In some cases, such as a connection between a rotor blade 5 and hub 6, the device 20 will have to periodically pause its operation until a technician manually pitches the rotor blade 5 to a new position to access more bolts due to obstacles in a travel path of the device 20. One or more sensors detect the obstacles along a travel path of the device 20 as the device automatically advances to adjacent existing bolt connections 13. Once such a sensor detects an obstacle along the travel path of the device 20, the device will pause its operation. In an embodiment, also a signal is provided to an operator person or a control device.

Figure 15:
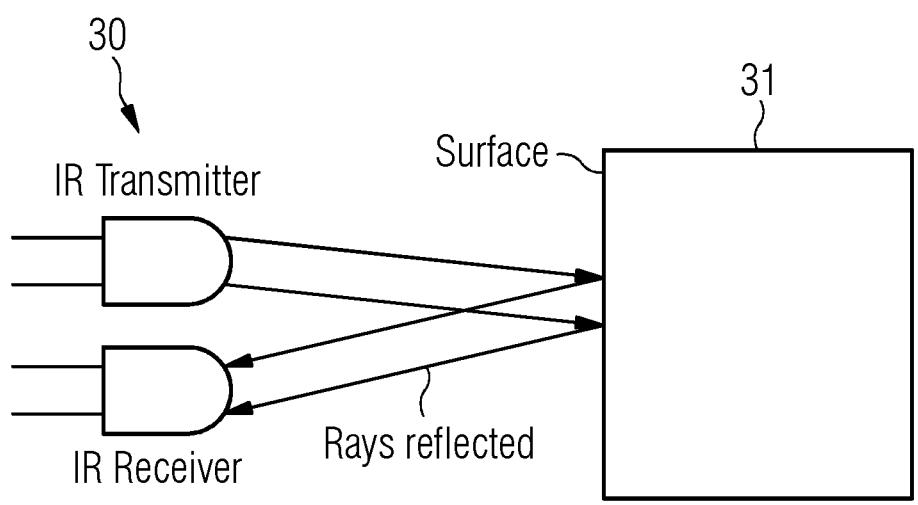
FIG. 15 depicts a schematic view of an infrared sensor detecting an object, in accordance with embodiments of the present invention.

FIG. 15 depicts a schematic view of an infrared sensor 30 detecting an object 31, in accordance with embodiments of the present invention. The one or more or sensors include an infrared sensor 30 and/or a camera (e.g., canny edge detection) positioned on the second unit 20b using a sensor mount 25, for example.

Figure 6:
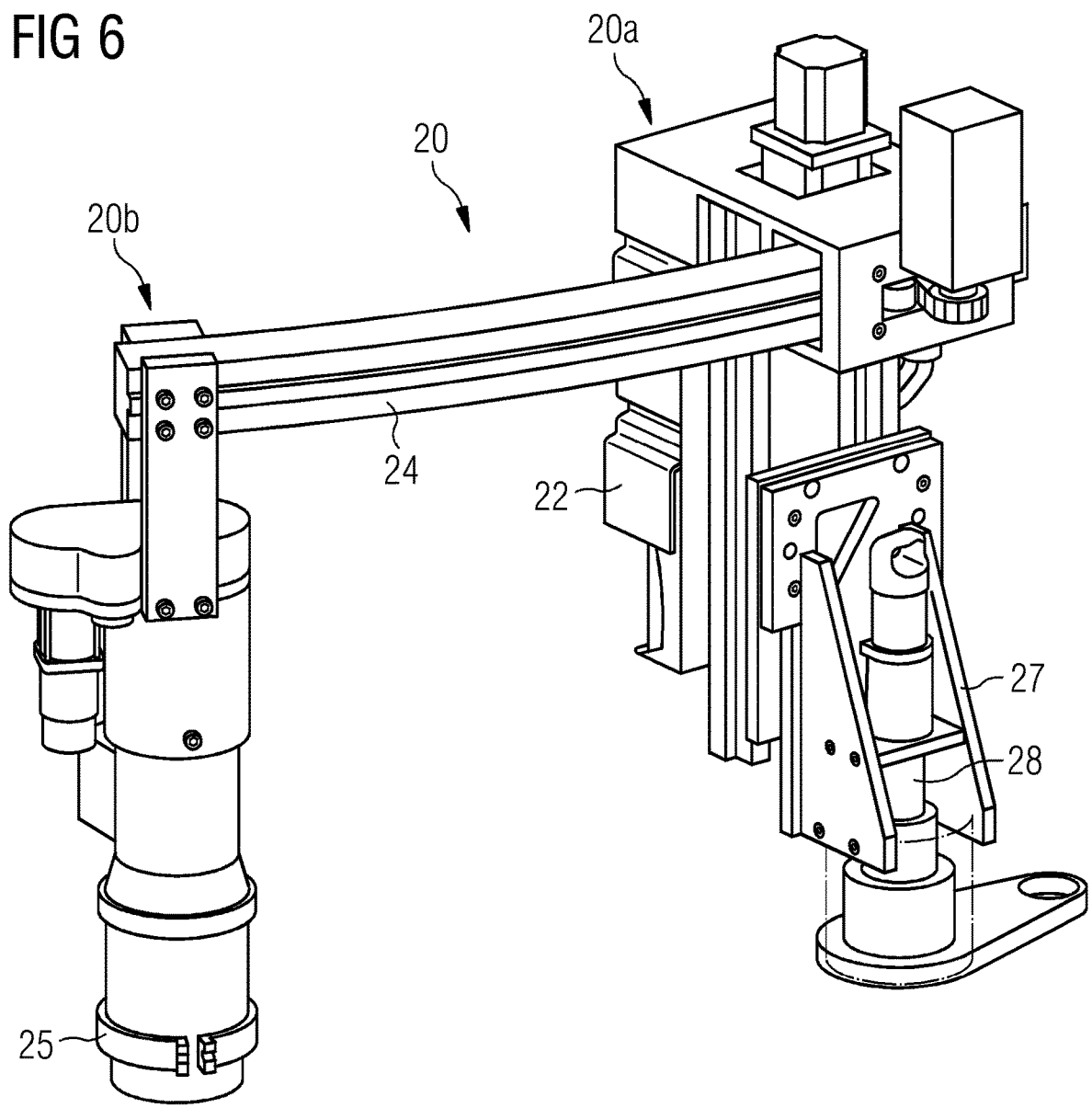
FIG. 6 depicts a perspective, transparent view of the automated bolt tensioning device of FIG. 5, in accordance with embodiments of the present invention.
Figure 7:
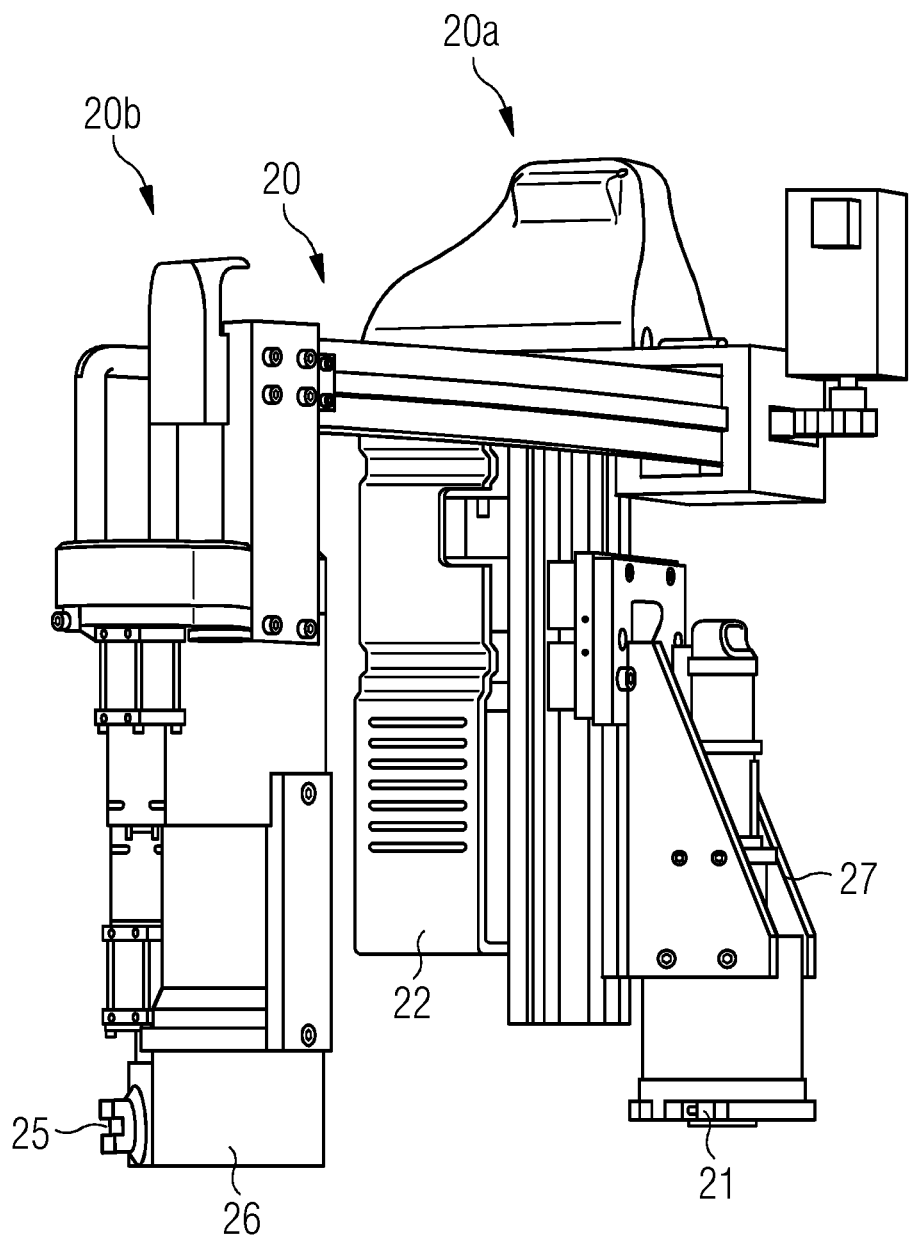
FIG. 7 depicts a first perspective view of the automated bolt tensioning device, in accordance with embodiments of the present invention.
Figure 8:
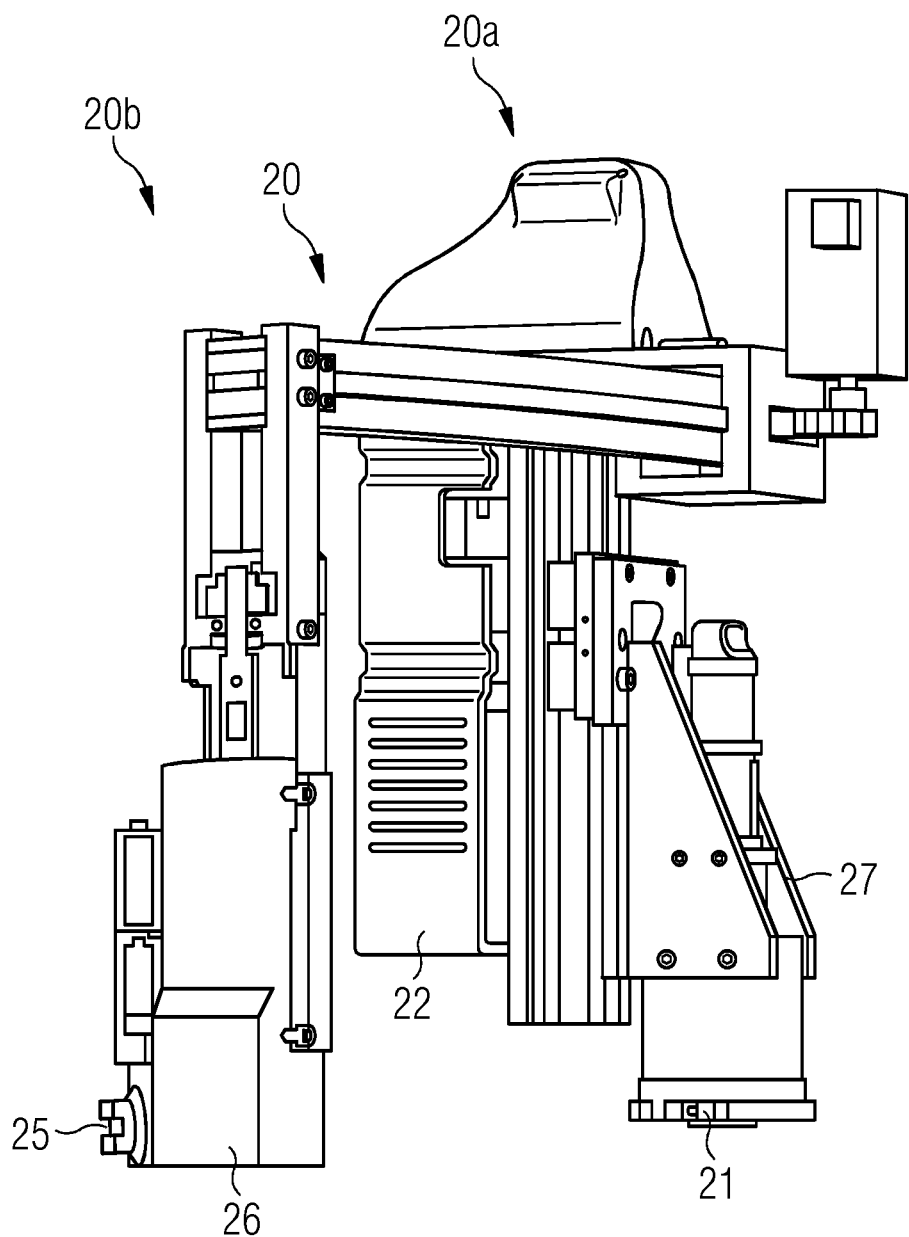
FIG. 8 depicts a partial cutaway view of a second unit of the automated bolt tensioning device of FIG. 7, in accordance with embodiments of the present invention.
Figure 9:
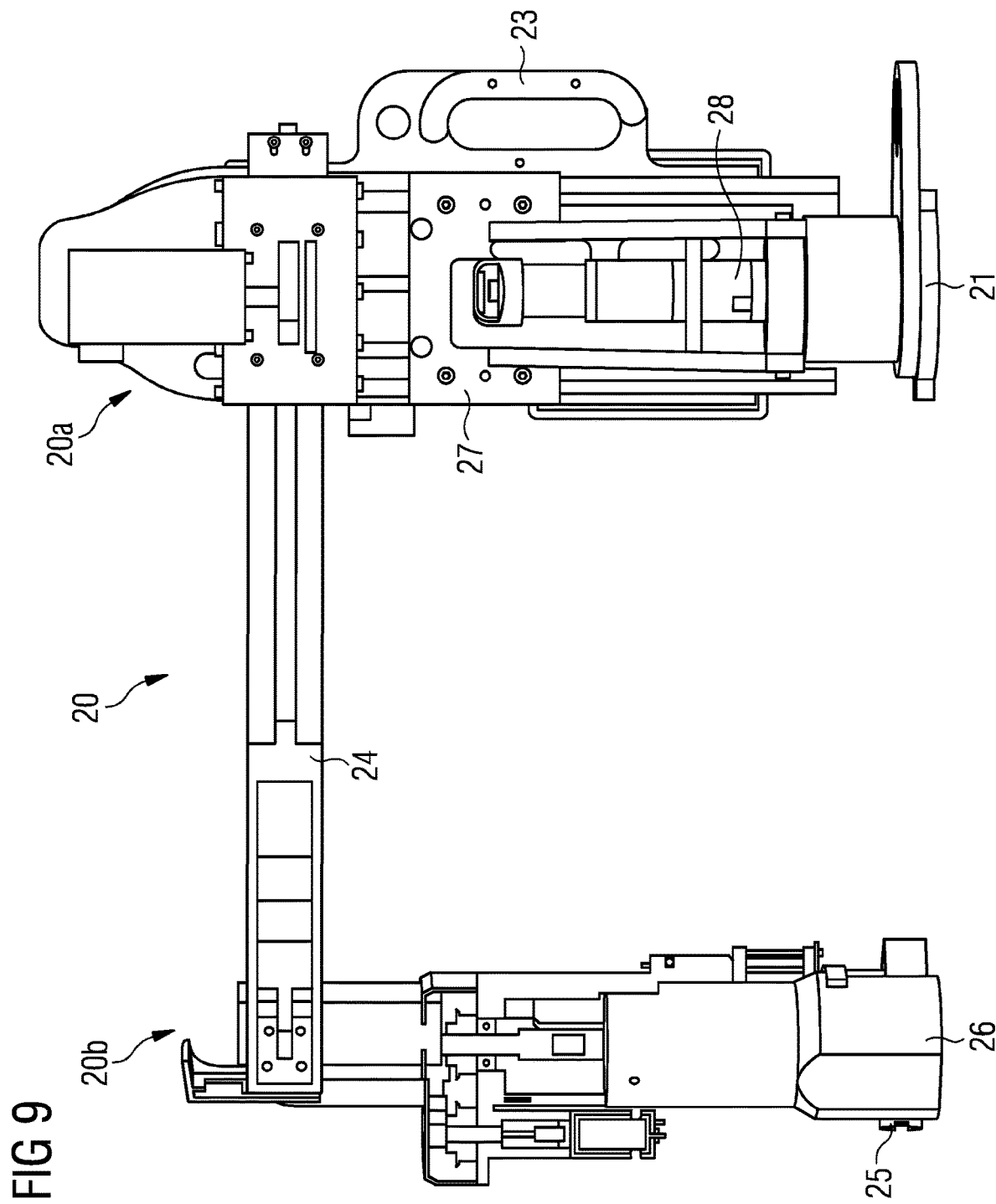
FIG. 9 depicts a partial cutaway view of the second unit and partial cutaway view of a slide arm of the automated bolt tensioning device of FIG. 7, in accordance with embodiments of the present invention.
Figure 10:
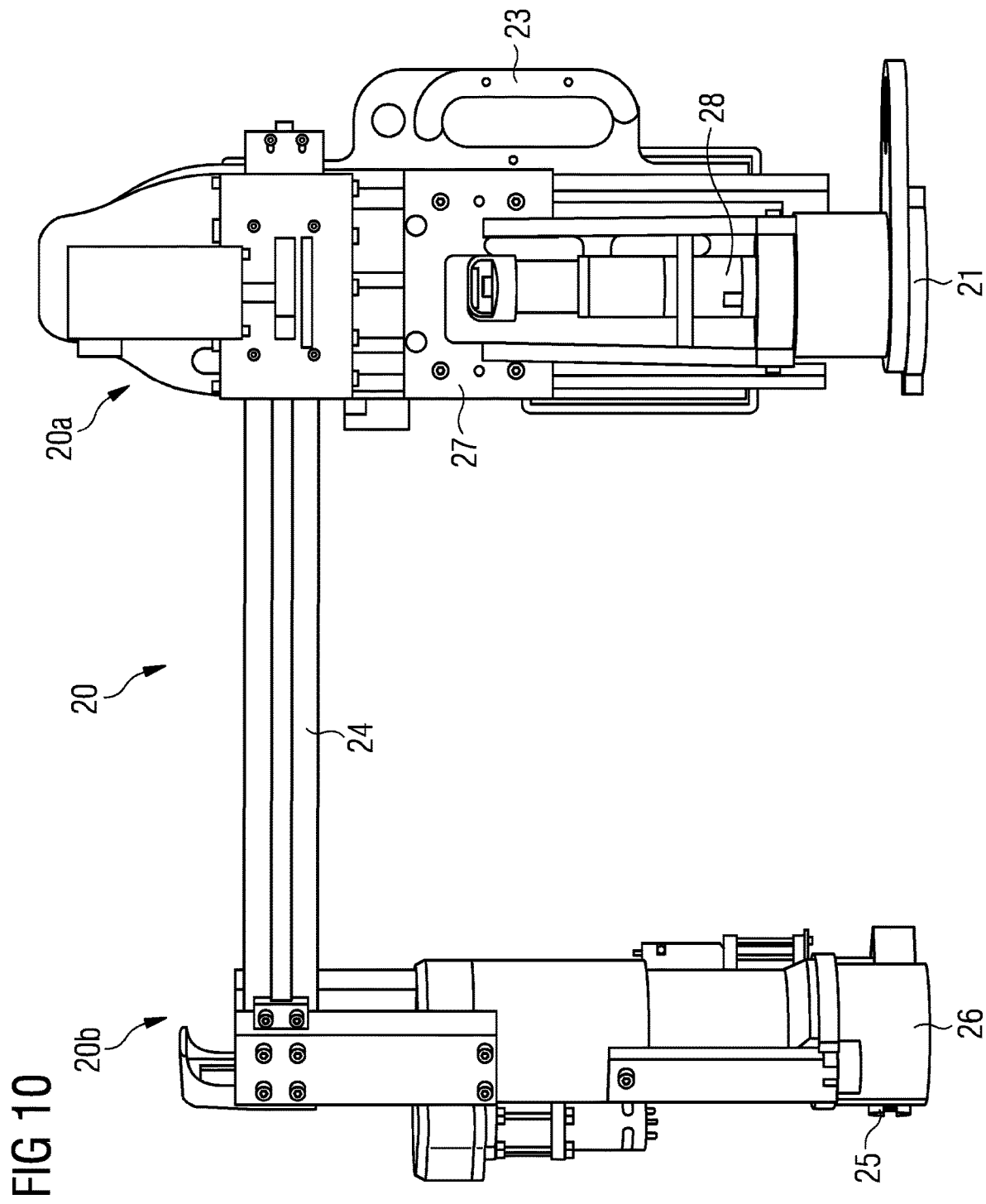
FIG. 10 depicts a front view of the automated bolt tensioning device, in accordance with embodiments of the present invention.

For other joints, such as tower connections where there are no such obstacles, the device 20 would be able to travel the full circle unimpeded. In an exemplary embodiment, the device 20 is designed/optimized for the blade-to-blade-bearing connection, such that the slide arm 24 is a curved rail designed to match a curvature of the bolted joints of the blade-to-blade bearing connection. In other embodiments, the slide arm 24 could be exchanged for different sizes/curvatures so the device 20 can tighten other bolted connections (e.g., tower flanges). As a result, the slide arm 24 is curved (as shown in FIG. 6) and has a curvature that corresponds to a curvature of the existing bolt connections 13 on a wind turbine component of the wind turbine 1.

The automated bolt tensioning device 20 reduces a number of required technicians from two or more to one, where multiple devices 20 could be supervised by the same technician(s). Automating the device's operation improves the ergonomics of the task and reduces risk to technician safety. In situations where many bolts need to be tightened, the device 20 can execute the task faster than a human team. The repeatability of the device 20 ensures quality of the task performed and consistency in the values with which the bolts are tightened, significantly reducing risk of improper workmanship. Further, the automatization of the task via the device 20 removes the technician from executing the work; instead, the technician can set up the device 20 and manipulate the data collected, leaving the technician free to perform other tasks while the device 20 executes its work.

Moreover, the device 20 also collects data to determine if the nuts/bolts are loosening between service intervals. At least one RFID antenna is used by the device 20 for emitting an electromagnetic field to energize a RFID tag associated with each of the existing bolt connections 13. The data received from the energized RFID tag is used to analyze whether the existing bolt connection 13 have loosened over time. The data collected can use RFID tags and performance indicators from the robot to uniquely track the bolt being tightened and to what pressure/tension/torque value. A singe RFID per ring could also be used, but using one RFID tag per bolt ensures a unique identifier per bolt, which is helpful in case of a bolt replacement (i.e., would require new RFID tag) and reduces complexity of programming the device. It also ensures that technicians do not accidentally re-tighten a bolt that was previously tightened (the robot is programmed to avoid duplicate tightenings within a certain time frame).

The device 20 may submit collected data, after tightening bolt connections 13, to a supervisory controller, so that this information can be stored in a central service database. Data in such a service database can then be used to schedule service intervals.

Embodiments of the device 20 further includes a control unit 22 configured to control a movement of the first unit 20a and the second unit 20b. The control unit 22 and other electronics 22 are contained within a housing attached to the first unit 20a, as shown in FIGS. 11 and 12.

The device 20 uses the existing turbine structure (e.g., the bolts themselves) to physically "walk" from bolt to bolt, and does not utilize auxiliary systems (e.g., rails, platforms, etc.) to maneuver itself in the working environment. Furthermore, the device 20 is designed to operate in an assembled wind turbine 1 or any other assembled machine, different to usual robots in manufacturing that are operated in an assembly or manufacturing workshop. FIG. 16 depicts the automated bolt tensioning device 20 placed on studs, in accordance with embodiments of the present invention. The device 20 works on the blade studs, which are the studs that hold the wind turbine blade 5 onto the blade bearing, which is then mounted onto the hub 6.

Accordingly, the device 20 reduces labor costs associated with bolt tightening and improves understanding of bolted joint behavior using data collection and analysis. Bolt tightening operations can be scaled up with the device, being performed at once by utilizing more than one device 20. Technicians will be exposed to safer working conditions, removing themselves from the task itself and supervise the device 20 operation and ensure the device 20 properly executes its function and validates data collection. Data collection on nut/bolt can be used to potentially extend service intervals for particular bolted connections 13 (e.g., if a joint remains tight year after year based on data collection it may only need to be inspected/re-tightened every X years instead of every one year). The device 20 regulates and verifies that the proper values are used to tighten each bolt and achieved during the tightening process.

In an embodiment, the device 20 may even interact with the wind turbine controller. Once the device identifies an obstruction or whether its orientation cannot guarantee safe processing of the work for example if the device would be upside down it could demand from the turbine controller to activate a rotation of the main rotor, and/or the yawing motor, and/or the pitching mechanism, so that the bolt connections will be repositioned so that the robot can continue to autonomously tighten further bolt connections 13.

In an alternative embodiment, the task could similarly be performed by a robotic arm centrally mounted relative to the bolted joint being tightened. The centrally mounted robotic arm may be larger and heavier than the device described above and may be operated with a support system (e.g., rail) for such a centrally mounted robot.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An automated bolt tensioner, comprising:
   a first unit configured to be releasably secured to a first subset of existing bolt connections of a further assembly, wherein the first unit includes a hollow, internally threaded attachment that threadably attaches the first unit to external threads of a stud protrusion of the existing bolt connections;
   a second unit configured to tighten a second subset of the existing bolt connections of the further assembly; and
   a slide arm connecting the second unit to the first unit, wherein the first unit and the second unit are each movable so that the automated bolt tensioner can automatically advance to adjacent existing bolt connections adjacent to the first subset and/or to the second subset of existing bolt connections.

2. The automated bolt tensioner of claim 1, wherein the attachment includes an extension that couples to a stud protrusion adjacent the first existing bolt connection.

3. The automated bolt tensioner of claim 1, wherein the second unit includes a tensioner for tensioning the existing bolt connections, a tensioner threader for threading the tensioner onto a stud protrusion of the existing bolt connections, and a torque application device for applying torque to a nut of the existing bolt connections after a bolt has been tensioned by the tensioner.

4. The automated bolt tensioner according to claim 1, wherein the first unit includes a Z axis slide permitting a vertical movement of the second unit and the first unit.

5. The automated bolt tensioner according to claim 1, further comprising one or more sensors configured to detect obstacles along a travel path of the automated bolt tensioner as the automated bolt tensioner automatically advances to adjacent existing bolt connections.

6. The automated bolt tensioner according to claim 5, wherein the one or more or sensors include an infrared sensor and/or a camera positioned on the second unit.

7. The automated bolt tensioner according to claim 1, further comprising a control unit configured to control a movement of the first unit and the second unit, wherein the control unit is contained within a housing attached to the first unit, wherein the control unit includes at least one RFID antenna for emitting an electromagnetic field to energize a RFID tag associated with each of the existing bolt connections, further wherein data received from the energized RFID tag is used to analyze whether the existing bolt connection have loosened over time.

8. The automated bolt tensioner according to claim 1, wherein the existing bolt connections are located on an operational wind turbine.

9. The automated bolt tensioner according to claim 1, wherein the slide arm is curved, wherein the slide arm has a curvature that corresponds to a curvature of the existing bolt connections on a wind turbine component of the wind turbine.

10. A method of automatically tightening existing bolt connections on a wind turbine tower with the automatic bolt tensioner according to claim 1.

11. The automatic bolt tensioner according to claim 1, wherein the automatic bolt tensioner is an autonomous bolt tensioner.

12. An automatic bolt tensioner, comprising:
    a first leg including a hollow, internally threaded attachment for threading the first leg onto external threads of a first existing bolt connection of a further assembly;
    a second leg including a bolt tensioning assembly for tightening a second existing bolt connection of the further assembly; and
    a slide arm connecting the first leg and the second leg, wherein actuation of the slide arm permits movement of the second leg with respect to the first leg to automatically advance the second leg to a third existing bolt connection for tightening the third existing bolt connection, while the first leg remains threadably attached to the first existing bolt connection.

13. The automatic bolt tensioner of claim 12, wherein actuation of the slide arm permits movement of the first leg with respect to the second leg to automatically advance the first leg to another existing bolt connection in a direction towards the second leg, while the second leg remains in contact with the third bolt connection.

14. The automatic bolt tensioner of claim 12, further comprising a Z axis actuator that permits a vertical movement of the second leg from a position above the second bolt connection to a position of contact with the second bolt connection.

15. The automatic bolt tensioner of claim 14, wherein actuation of the Z axis actuator permits a vertical movement of the first leg from a position above the first bolt connection to a position of contact with the first bolt connection.

16. The automatic bolt tensioner according to claim 12, wherein the bolt tensioning assembly includes a tensioner for tensioning the existing bolt connections, a tensioner threader for threading the tensioner onto a stud protrusion of existing bolt connections, and a torque application device for applying torque to a nut of the existing bolt connections after a bolt has been tensioned by the tensioner.

17. The automatic bolt tensioner according to claim 12, wherein the automatic bolt tensioner is an autonomous bolt tensioner.

18. An automated bolt tensioner, comprising:
a first unit configured to be releasably secured to a first subset of existing bolt connections of a further assembly, wherein the first unit includes an attachment that attaches the first unit to the existing bolt connections;
a second unit configured to tighten a second subset of the existing bolt connections of the further assembly;
a slide arm connecting the second unit to the first unit, wherein the first unit and the second unit are each movable so that the automated bolt tensioner can automatically advance to adjacent existing bolt connections adjacent to the first subset and/or to the second subset of existing bolt connections; and
a control unit configured to control a movement of the first unit and the second unit, wherein the control unit is contained within a housing attached to the first unit, wherein the control unit includes at least one RFID antenna for emitting an electromagnetic field to energize a RFID tag associated with each of the existing bolt connections, further wherein data received from the energized RFID tag is used to analyze whether the existing bolt connection have loosened over time.

\* \* \* \* \*